(No Model.)
M. S. CRISMORE.
ANIMAL TRAP.
No. 436,217. Patented Sept. 9, 1890.
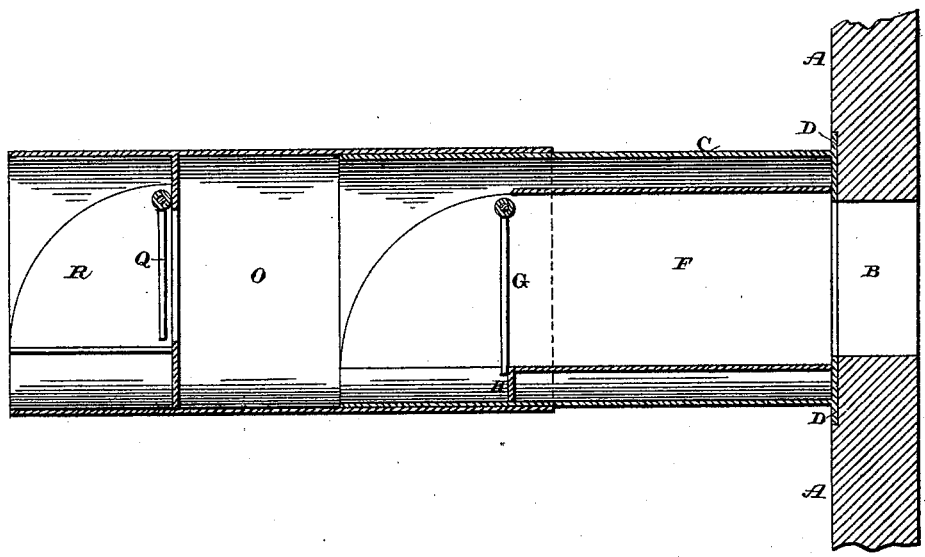
Witnesses:
E. P. Ellis,
J. M. Nesbit.
Inventor:
M. S. Crismore,
per
Lehmann & Pattison,
Att'y

UNITED STATES PATENT OFFICE.

MORGAN S. CRISMORE, OF ODESSA, NEBRASKA.

ANIMAL-TRAP.

SPECIFICATION forming part of Letters Patent No. 436,217, dated September 9, 1890.

Application filed May 24, 1890. Serial No. 353,049. (No model.)

*To all whom it may concern:*

Be it known that I, MORGAN S. CRISMORE, of Odessa, in the county of Buffalo and State of Nebraska, have invented certain new and useful Improvements in Traps; and I do hereby declare the following to be a full, clear, and exact description of the invention, such as will enable others skilled in the art to which it pertains to make and use it, reference being had to the accompanying drawing, which forms part of this specification.

My invention relates to an improvement in traps; and it consists in the combination and arrangement of parts, which will be fully described hereinafter.

The object of my invention is to provide a trap which can be attached inside of a box through which an opening has been made, and which trap will allow rats and mice to freely pass into the box, but will prevent their passing out again.

The accompanying drawing represents a longitudinal section of a trap which embodies my invention.

A represents the side of a box or bin through which the hole B is made.

Secured to the inner side of the box by nails or tacks is the flanged pipe or tube C, of any suitable diameter. The flange D is formed upon the inner end of the pipe, so that the trap can be nailed directly to the inside of the box, as shown. Inside of this tube C is secured a square pipe or tube F, and the opening through the outer end of the tube C, and through which the animal passes, corresponds in size to this pipe F, rather than to the one C. Pivoted in the inner end of this square pipe F is a gate G, which moves vertically, and which has its lower end to stop or rest against the shoulder H, formed in the tube F, and which shoulder prevents the gate from being forced outside. As the animal enters through the pipe F, it readily passes under and beyond the gate; but after the gate has once closed the animal cannot open it so as to make its escape. This one pipe F alone is sufficient, as it allows the rats and mice to freely pass into a box or bin, but it will allow none of them to escape. As a matter of security a second pipe O is placed upon the inner end of the one F, and this pipe O is provided with a perforated partition, and the opening through this partition is controlled by a gate Q.

In order to prevent the animals from having access to the gate from either its lower edge or opposite sides, the angular tube R is placed on beyond the partition, and this tube serves as a guard for the gate. After a rat or mouse has passed through the gate in the tube F it finds itself a prisoner between the two gates, and, being unable to escape, is compelled to pass on through the second gate into the box or bin, from which escape is impossible. The use of the two tubes and the two gates is preferable; but a single tube and a single gate will answer every purpose.

Having thus described my invention, I claim—

1. In a trap, the combination, with a frame or box having an opening, of a tube adapted to be secured over the opening, a tube within the first said tube and of less diameter, and a gate at the inner end of the internal tube, substantially as shown.

2. In a trap, the combination, with a box having an opening, of a tube having an internal annular flange, which tube is placed over the opening, and a smaller tube within the first said tube, having its outer end secured to the said internal flange, and a gate at the inner end of the said internal tube, substantially as specified.

3. In a trap, the combination, with a box having an opening, of a tube having an internal tube of less diameter, both adapted to be placed over the said opening, a gate at the inner end of said smaller tube, and a second detachable tube placed upon the outer end of the first said tube, and a gate in the detachable tube, having a guard at its lower end, for the purpose described, substantially as shown.

In testimony whereof I affix my signature in presence of two witnesses.

MORGAN S. CRISMORE.

Witnesses:
 GEORGE HACKETT,
 JOHN PHILIPPAR.